(12) United States Patent
Fuhrmann et al.

(10) Patent No.: US 12,103,213 B2
(45) Date of Patent: Oct. 1, 2024

(54) METHOD AND DEVICE FOR DETECTING A GEOMETRIC FEATURE OF MOLDED PARTS

(71) Applicant: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

(72) Inventors: Gerd Fuhrmann, Aachen (DE); Klaus Schönhoff, Würselen (DE)

(73) Assignee: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

( * ) Notice: Subject to any disclaimer, the term of this patent is extended or adjusted under 35 U.S.C. 154(b) by 286 days.

(21) Appl. No.: 17/289,456

(22) PCT Filed: Oct. 23, 2019

(86) PCT No.: PCT/EP2019/078837
§ 371 (c)(1),
(2) Date: Apr. 28, 2021

(87) PCT Pub. No.: WO2020/089005
PCT Pub. Date: May 7, 2020

(65) Prior Publication Data
US 2021/0394416 A1 Dec. 23, 2021

(30) Foreign Application Priority Data

Oct. 29, 2018 (DE) .................. 10 2018 126 966.8

(51) Int. Cl.
*B29C 45/78* (2006.01)
*B29C 45/17* (2006.01)
(Continued)

(52) U.S. Cl.
CPC .......... *B29C 45/78* (2013.01); *B29C 45/1769* (2013.01); *B29C 45/7686* (2013.01);
(Continued)

(58) Field of Classification Search
CPC . B29C 45/78; B29C 45/1769; B29C 45/7686; B29C 2945/7604;
(Continued)

(56) References Cited

U.S. PATENT DOCUMENTS 4,882,498 A * 11/1989 Cochran ............ G01N 21/8806
250/559.39
5,962,854 A * 10/1999 Endo ........................ G01J 5/024
250/349

(Continued)

FOREIGN PATENT DOCUMENTS

CN 102321520 A * 1/2012 ............ C12M 21/16
DE 8711599 U1 10/1987
(Continued)

OTHER PUBLICATIONS

Translation DE-102009001682 (Year: 2010).*
(Continued)

*Primary Examiner* — Peter J Macchiarolo
*Assistant Examiner* — Monica S Young
(74) *Attorney, Agent, or Firm* — LUCAS & MERCANTI, LLP

(57) ABSTRACT

A method and a device for detecting a geometric feature of consistent molded parts takes into account the different stages of cooling due to different durations of transport of the individual removed molded parts to the inspection (Continued)

system. Both the geometric feature and the temperature of each molded part is measured. The detected geometric features are corrected using a calibration function taking into account the measured temperatures.

17 Claims, 3 Drawing Sheets

(51) Int. Cl.
  *B29C 45/76* (2006.01)
  *G01B 5/14* (2006.01)
  *G01B 21/04* (2006.01)
(52) U.S. Cl.
  CPC .............. *B29C 2945/7604* (2013.01); *B29C 2945/761* (2013.01); *B29C 2945/7629* (2013.01); *B29C 2945/76421* (2013.01); *B29C 2945/76464* (2013.01); *G01B 5/14* (2013.01); *G01B 21/045* (2013.01)
(58) Field of Classification Search
  CPC ...... B29C 2945/761; B29C 2945/7629; B29C 2945/76464; G01N 2021/845; G01B 5/0014; G01B 21/045
  USPC ......................................................... 73/865.9
  See application file for complete search history.

(56) References Cited

U.S. PATENT DOCUMENTS

| | | | |
|---|---|---|---|
| 10,532,513 B2 | 1/2020 | Bauza | |
| 10,733,438 B2 | 8/2020 | Osuga | |
| 10,773,438 B2 | 9/2020 | Panjwani | |
| 2005/0156343 A1* | 7/2005 | Cochran | B29C 45/7686 |
| | | | 425/169 |
| 2006/0228100 A1* | 10/2006 | Ignatowicz | G06T 5/80 |
| | | | 396/153 |
| 2009/0107896 A1* | 4/2009 | Gochar, Jr. | G01N 21/909 |
| | | | 425/169 |
| 2013/0018115 A1* | 1/2013 | Isozaki | B03C 1/18 |
| | | | 524/441 |
| 2015/0321404 A1* | 11/2015 | Panjwani | B29C 45/76 |
| | | | 700/197 |
| 2016/0097633 A1 | 4/2016 | Boni | |
| 2017/0227472 A1* | 8/2017 | Colton | B29C 49/78 |
| 2020/0024118 A1* | 1/2020 | Hayakawa | A61L 2/10 |
| 2021/0394416 A1 | 12/2021 | Fuhrmann | |

FOREIGN PATENT DOCUMENTS

| | | | | |
|---|---|---|---|---|
| DE | 102006027028 A1 | | 12/2007 | |
| DE | 102009001682 A1 * | | 9/2010 | ......... B29C 45/7686 |
| DE | 102013105623 A1 | | 12/2014 | |
| DE | 102013217422 A1 | | 3/2015 | |
| DE | 102016118670 A1 * | | 4/2018 | ............ B29C 45/76 |
| EP | 1175990 A1 | | 1/2002 | |
| EP | 3315275 A1 * | | 5/2018 | ............ B29B 11/16 |
| EP | 3363767 A1 | | 8/2018 | |
| EP | 3873715 B1 | | 10/2018 | |
| JP | 04330976 A * | | 11/1992 | |
| WO | 2015023673 A2 | | 2/2015 | |
| WO | WO-2021205377 A1 * | | 10/2021 | ........... B29C 45/768 |

OTHER PUBLICATIONS

Translation JPH04330976 (Year: 1992).*
Translation_DE102016118670 (Year: 2018).*
English translation of the international preliminary report on patentability (Chapter 11) dated Feb. 15, 2021; 6 pages.
Notice of Opposition from the European Patent Office (EPO) dated Jul. 14, 2023, 26 Pages.

* cited by examiner

METHOD AND DEVICE FOR DETECTING A GEOMETRIC FEATURE OF MOLDED PARTS

CROSS-REFERENCE TO RELATED APPLICATIONS

This application is a 371 of PCT/EP2019/078837, filed Oct. 23, 2019, which in turn claims the priority of DE 10 2018 106 790.9 filed Oct. 29, 2018. The priority of both applications is hereby claimed and both applications are incorporated herein by reference.

BACKGROUND OF THE INVENTION

The invention relates to a method and a device for detecting a geometric feature of consistent molded parts in an optical inspection system.

The molded parts are produced by way of casting or molding with the aid of a casting or molding machine. The casting or molding is a primary forming process, in which liquids, pastes or slurry are filled into the mold impressions (cavities) of a molding tool and solidify there. Apart from primary forming from the liquid state of metals, in particular primary forming from the plastic state, in particular injection molding of plastics, is of particular importance.

In an injection-molding machine, thermoplastic material is plasticized and forced under high pressure into the cavities of the mold tool. The plasticized material is typically at a temperature of 200°-300° Celsius and cools down in the cavities of the molding tool until a stiffness of the molded parts sufficient for demolding is achieved. For demolding the molded parts from the cavities, the ejector side of the clamping unit is opened and the molded parts are demolded and ejected for example by pins penetrating into the cavity. During the demolding of the molded parts from the molding tool, they have not yet cooled down completely, but are at an elevated temperature in comparison with the surrounding temperature in the region of the casting or molding machine. Directly after the demolding, the molding tool closes again and the next injection-molding cycle begins.

Geometric features, such as the dimensions of the molded parts and deviations in the shape of the molded parts, represent an important quality feature. In the case of consistent molded parts mass produced by way of injection molding, continuous and rapid detection of the geometric features with the aid of an optical inspection system is of particular importance, in order to establish variations of the dimensions of the molded parts and changes in shape promptly while the production process is in progress and, when there are changes outside a tolerance range, to take corresponding countermeasures in the production process of the molded parts.

In order to detect in an inspection system changes of geometric features of the molded parts produced, the demolded molded parts are transported by a transporting device to an inspection system while they are still cooling down. There, in the process of passing through, at least one geometric feature of each molded part is detected in the inspection system with the aid of at least one digital camera. It is however problematic in the detection that the geometric features of the molded parts change to a particularly great extent in the first minutes after demolding. In addition to this there is the fact that the length of time it takes to transport the demolded molded parts to the inspection system at least sometimes varies. The reason for this lies in the construction of the conveying device comprising multiple conveyors for transporting the demolded molded parts to the inspection system. The conveying device usually has along with a delivery belt, also referred to as a cross conveyor, onto which the demolded molded parts fall, an ascending cooling conveyor, also referred to as a cooling conveyor. Finally, a sorting conveyor is often arranged downstream of the ascending cooling conveyor. Arranged between the conveyors may be intermediate stores for the molded parts, in which the molded parts lie in a disorderly manner and are passed on for further transport. As a result of this, the length of time it takes to transport the demolded molded parts to the inspection system at least sometimes varies. The values of the geometric features have quite a great variance and are not readily suitable for correcting the production process of the molded parts.

BRIEF SUMMARY OF THE INVENTION

Against the background of this prior art, the invention is based on the object of providing a method and a device for detecting a geometric feature of consistent molded parts in an inspection system that provides reliable information concerning the detected geometric features of the consistent molded parts irrespective of the time it takes to transport the demolded molded parts to the inspection system.

This object is achieved by a method and a device for detecting a geometric feature of consistent molded parts in an inspection system in which detected geometric features are corrected using a calibrating function while taking into account measured temperatures of the consistent molded parts.

The invention takes into account the different stages of cooling down due to the varying lengths of time it takes to transport the individual demolded molded parts to the inspection system, in that not only is the at least one geometric feature detected in the inspection system, but also the temperature of each molded part is contactlessly measured while the molded parts are passing through the inspection system. With the aid of a calibrating function, the detected geometric features are corrected while taking into account the measured temperatures. By normalizing the temperature of the detected geometric features, the geometric features of the molded parts for example after cooling down completely to the surrounding temperature can be predicted. The detected geometric features corrected in such a way allow a reliable assessment not only of the quality of the molded parts produced but also of problems in the production process of the casting or molding machine. The corrected geometric features can therefore also be advantageously used for controlling the production process.

In series of tests with specimen, e.g., reference, molded parts of the consistent molded parts to be investigated, the calibrating function is created. The geometric feature of the reference molded parts used for creating the calibrating function must correspond to a setpoint value or lie in a set range. The calibrating function to be created describes the change in the geometric feature of the reference molded part in dependence on the temperature.

The mass detection of the geometric feature of the consistent molded parts is performed with the aid of at least one digital camera while the molded parts are passing through the inspection system in a conveyed stream. The object rate preferably lies in the range of 40-80 molded parts/second.

To make the high object rates possible, the temperature of each molded part must also be detected at a consistent object rate while the molded parts are passing through the inspection system in the conveyed stream. For the contactless measurement of the temperature provided according to the invention, radiation sensors, also referred to as pyrometers, are suitable in particular. Dependent on the stage of cooling down, each molded part emits a temperature-dependent thermal radiation. This thermal radiation is detected by the radiation sensor and evaluated. The contactless temperature measurement has the following advantages for the present application:

unproblematic measurement on moving molded parts
rapid temperature measurement
freedom from wear
little temperature influence on the molded parts
avoidance of mechanical damage to the molded parts The range of the measuring wavelength of the radiation sensor depends on the one hand on the material of the molded part to be measured and on the temperature to be expected. Taking into account the usual time it takes to transport the molded parts between an injection-molding machine and an optical inspection system, radiation sensors for measuring lower temperatures in the range of 20-100° Celsius come into consideration. Such sensors have a measuring wavelength in the range of LWIR, i.e. between 8 and 14 μm.

The radiation sensors are for example thermal or photoelectric detectors, in particular uncooled or cooled photodiodes. The measuring wavelength is determined on the one hand by the detector used and possibly by upstream optical filters. Dependent on the measuring wavelength range, the radiation sensors are windowless or are provided with lenses of glass, quartz glass or of crystals.

The detection of the geometric feature and the contactless measurement of the temperature of each molded part is performed according to the invention while the molded parts are passing through the inspection system in a conveyed stream. Usual speeds of the molded parts in the conveyed stream of an inspection system for injection-molded molded parts are between 100 m/min and 240 m/min. The time interval between the detection of the geometric feature of each molded part and the contactless measurement of the temperature is extremely small because of the usual size of the inspection system and the high speed of the conveyed stream. Further cooling down of the molded parts as a result of the time interval of the measurements in the inspection system is therefore virtually negligible. It should in any case be ensured in the inspection system that the time period between the detection of the geometric feature and the contactless measurement of the temperature of each molded part does not exceed one second.

Preferably, within the inspection system, the temperature of each molded part is measured before the geometric features are detected. In principle, however, the reverse sequence of measurements is also possible.

In order to improve the resolution of the measured temperature and the geometric features, the molded parts preferably pass through the inspection system in a conveyed stream of a single row.

In an advantageous refinement of the invention, the molded parts in the conveyed stream of a single row are also individually separated, so that all of the molded parts are at a consistent distance from one another. As a result, it can be ensured that, as they pass through the inspection system, only one molded part at a time is in the beam of the digital camera and the radiation sensor.

The beam of the radiation sensor defines its detection range. The beam of the radiation sensor can be focused by means of an optical unit belonging to the radiation sensor. In this case, a first convergent portion of the beam is followed by a second, divergent portion. Without such a focusing optical unit, the beam follows a divergent path from the radiation sensor.

In the case of very high speeds of the molded parts in the conveyed stream, dependent on the radiation sensor used, the slow response of the radiation sensor can lead to inaccuracies in the measured temperature values. In a refinement of the invention, it is therefore provided that the speed of the conveyed stream of the molded parts is reduced for a time. The periodic reduction in the speed of the conveyed stream allows particularly accurate measured temperature values to be obtained for a time and these values to be passed on for separate evaluation. In return for the greater accuracy, the resultant impairment of the average object rate must be accepted.

In order to create constant controlled boundary conditions for the temperature measurement with the radiation sensor and thereby obtain reliable measured temperature values, in a refinement of the invention it is proposed that the beam of the at least one radiation sensor hits a diaphragm and the conveyed stream passes through the beam between the at least one radiation sensor and the diaphragm. The temperature of the diaphragm is kept constantly at a specified level. Keeping the temperature of the diaphragm constant has the effect that, in the time interval in which the molded part is in the detection range of the radiation sensor and the radiation of the molded parts and of the background defined by the diaphragm are superposed, the same conditions always prevail. The temperature of the diaphragm is kept constant for example by a Peltier element or some other heating-cooling element.

In order to reduce unfavorable effects of the slow response of the radiation sensor, in a refinement of the invention the radiation sensor is only subjected to small changes in the radiation. In order to keep the changes in radiation small, the temperature of the diaphragm is kept constantly at a temperature that lies in the temperature window to be expected of the temperatures of the molded parts. As long as the molded parts have been cooled down for example almost to the surrounding temperature while passing through the optical inspection system, the temperature of the diaphragm is for example kept constantly at the surrounding temperature. The radiation sensor is consequently subjected the whole time to a radiation of the diaphragm corresponding to the surrounding temperature, which changes only little due to the molded parts passing through, which are at temperatures differing little from the surrounding temperature.

One aim of the controlled production process of the molded parts is to keep constant certain geometric features of the molded parts produced, for example plastic closure caps. An important geometric feature of a closure cap is for example its diameter, which is to be kept constant. In order to control the production process, the corrected geometric features, i.e. the geometric features normalized by means of the measured temperature, are compared as a controlled variable with a setpoint value for the geometric feature, here the set diameter of the closure cap, as a reference variable. A deviation between the controlled variable and the reference variable is fed to a controller, which forms a manipulated variable for a controlled system of the casting or molding machine, here an injection-molding machine. Manipulated variables for the controlled system of the injection-molding machine may be for example the injection molding pressure, the temperature of the plasticizing unit, the cooling temperature of the molding tool or the holding pressure time. By means of this manipulated variable, various disturbances of the injection-molding process can be corrected, such as for example changes in the polymer melt, changes in the temperature of the coolant and changes in the extruder as a result of deposits or wear.

BRIEF DESCRIPTION OF THE DRAWINGS

The invention is explained in more detail below on the basis of an exemplary embodiment.

DETAILED DESCRIPTION OF THE PREFERRED EMBODIMENTS

Figure 1:
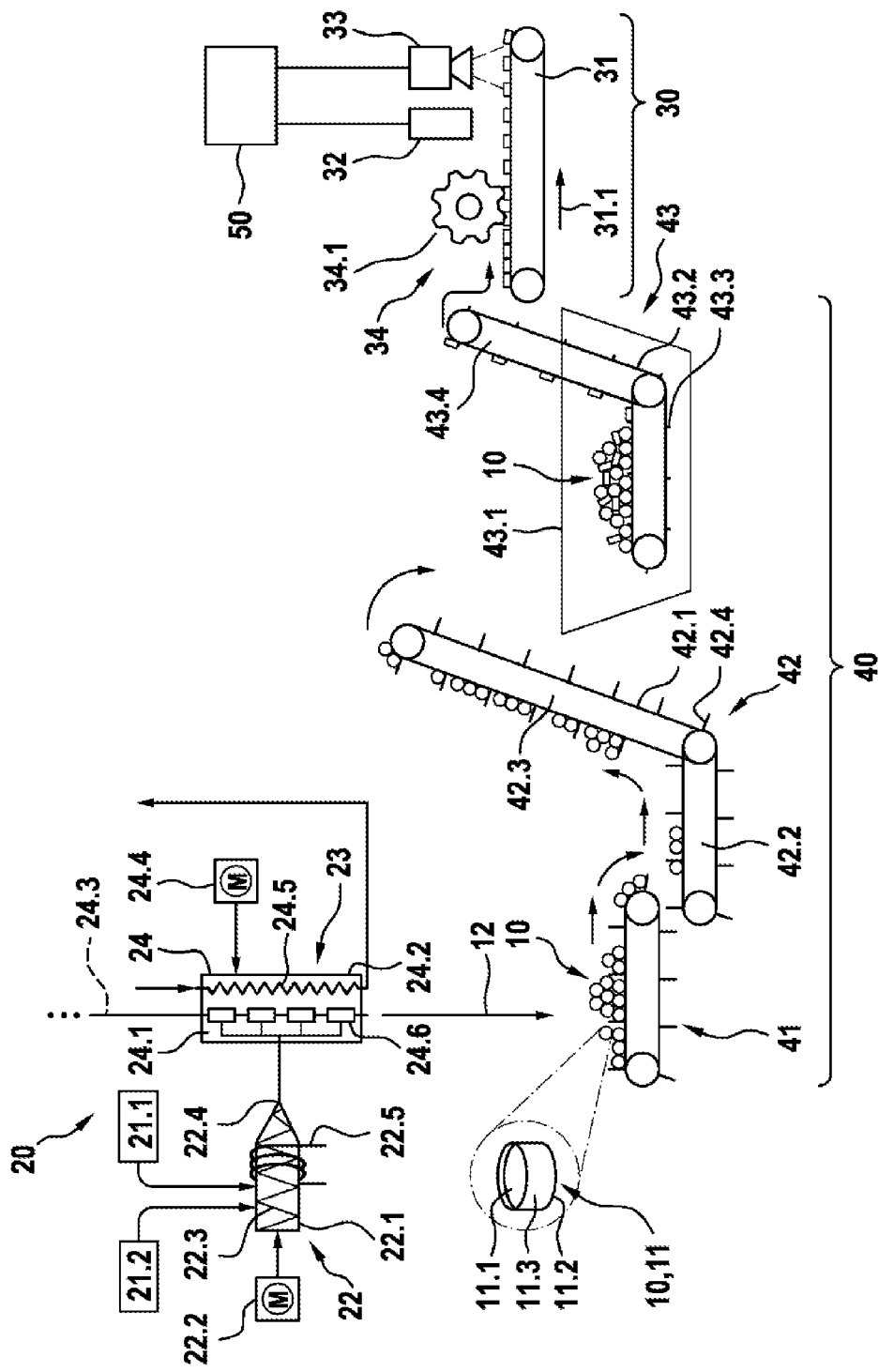
FIG. 1 shows a schematic arrangement of a device for carrying out the method according to the invention.
Figure 2:
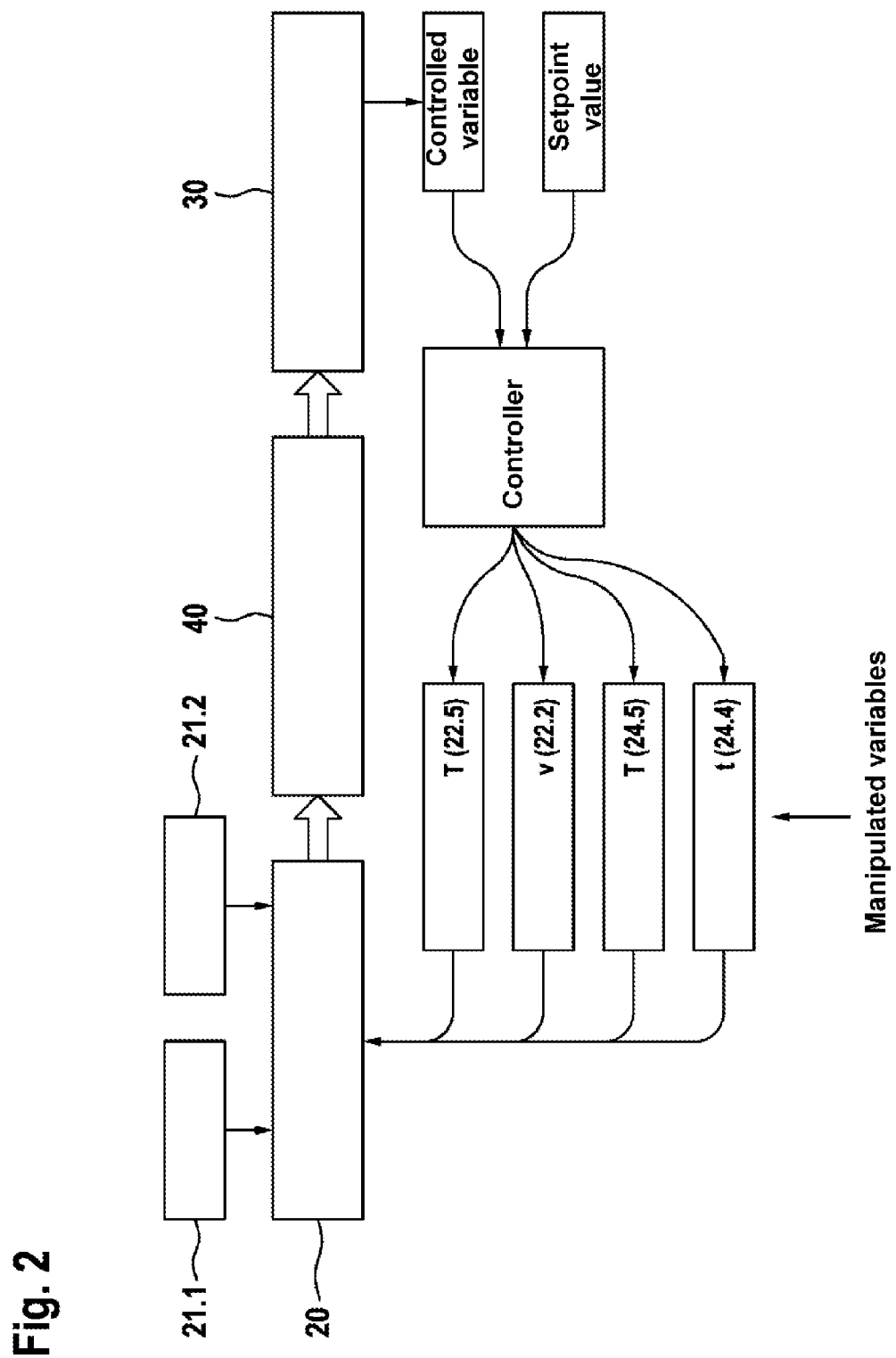
FIG. 2 shows a schematic representation of a controlled production process of molded parts using the method according to the invention and FIG. 3 shows an enlarged representation of a digital camera and a radiation sensor of an inspection system for detecting the geometric features.

The device for detecting at least one geometric feature of consistent molded parts (10) comprises as essential components a casting or molding machine (20), an inspection system (30), a conveying device (40), which is set up for transporting the demolded molded parts (10) to the inspection system (30), and also a computer system (50). The molded parts (10) are for example closure caps (11) with an end opening (11.1), a bottom surface (11.2) opposite the end opening (11.1) and also a lateral surface (11.3), extending between the bottom surface (11.2) and the opening (11.1).

In the exemplary embodiment shown, the casting or molding machine (20) is an injection-molding machine in which polymer pellets (21.1) and pigment (21.2) are processed as starting materials (21). The injection-molding machine shown consists of two units, the plasticizing unit (22), which plasticizes, prepares and meters the starting material (21), and also the clamping unit (23), which closes, keeps closed and re-opens a molding tool (24).

The plasticizing unit (22) comprises a plasticizing cylinder (22.1) and a screw (22.3) arranged rotatably therein by means of a motor (22.2). Arranged at one end of the plasticizing cylinder (22.1) is a filling hopper, which is not shown, for charging with the starting material (21). At the other end of the plasticizing cylinder (22.1) there is a nozzle (22.4). This represents the transition to the clamping unit (23).

The clamping unit (23) comprises the molding tool (24), which can be separated into two halves along a mold parting plane (24.3). The molding tool (24) has a number of mold impressions, referred to hereinafter as cavities (24.6), for example 96 cavities (24.6). The mold halves are usually mounted on two platens, which are not shown for the sake of overall clarity, one of which, the nozzle side (24.1), is rigid and is facing the nozzle (22.4) of the plasticizing unit (22). The ejector side (24.2) of the molding tool (24) is movably arranged and is moved away from or pressed with force onto the nozzle side (24.1) by means of a motorized drive (24.4). The ejector side (24.2) includes an ejector mechanism, which demolds the molded parts (10) from the cavities (24.6) of the molding tool (24). Also arranged in the ejector side (24.2) of the molding tool (24) is a cooling means (24.5) for controlling the temperature of the molding tool (24).

The starting material (21) in the form of pellets trickles into the flights of the rotating screw (22.3). The pellets are conveyed by the screw (22.3) in the direction of the nozzle (22.4) and warmed by the plasticizing cylinder (22.1), which is heated by means of a heating means (22.5), and the frictional heat and are melted. The melt collects in front of the nozzle (22.4). As soon as an amount of melt that is sufficient for filling the cavities (24.6) has collected, the phase of injection into the cavities (24.6) of the molding tool (24) begins. The melt is thereby forced under high pressure through the nozzle (22.4) into the cavities (24.6) via a gating system. The injected melt is typically at a temperature between 200 and 300° Celsius. Since the molding tool (24) is at a lower temperature than the melt, the latter already cools down while it is being injected. In order to compensate partially for the volume shrinkage accompanying the cooling down, a reduced pressure is often also maintained after the injection, in order that melt can continue to flow and compensate for the shrinkage. This operation is also referred to as holding.

After completing the holding, the nozzle (22.4) can be closed and the plasticizing and metering operation begun in the plasticizing unit (22) for the next injecting operation. The previously injected melt cools down in the molding tool (24) until a stiffness sufficient for demolding the molded parts (10) is achieved. At this point in time, the molded parts are still at a temperature that is significantly above the surrounding temperature of the casting or molding machine (20), which lies between the temperature of the injected melt and the surrounding temperature.

For demolding the molded parts (10) from the molding tool (24), the ejector side (24.2) of the molding tool (24) is opened and the molded parts (10) are ejected by pins penetrating into the cavities (24.6). In the production of closure caps (11), for example, 96 closure caps (11) are ejected from the cavities (24.6) every three seconds. The closure caps (11) fall as piece goods in the direction of the arrow (12) onto a delivery belt (41), which is arranged under the molding tool (24).

The delivery belt (41) is followed by an ascending cooling conveyor (42) with a horizontal portion (42.2) and an upwardly inclined portion (42.3), which comprises a gas-permeable transporting belt (42.1) and a driver (42.4) arranged on the transporting belt (42.1) transversely to the conveying direction. The gas-permeable transporting belt (42.1) is flowed through by cooling air, so that the ascending cooling conveyor (42) not only transports further the closure caps (11) transferred from the delivery belt (41) onto the horizontal portion (42.2), but at the same time cools them down further by means of the cooling air flowing through the gas-permeable transporting belt (42.1). At the upper deflection of the transporting belt (42.1), the closure caps (11) fall in a disorderly manner into an intermediate store (43.1) of a sorter (43). The sorter (43) comprises a circulating transporting belt (43.2), on which slats (43.3), also referred to as sorting bars, are arranged transversely to the conveying direction. By means of the sorting bars, the closure caps (11) lying as piece goods in the intermediate store (43.1) are conveyed into an upwardly inclined sorting section (43.4) of the sorter (43). In the sorting section (43.3), the sorting takes place by means of gravitational force. Closure caps (11) that are not resting with their bottom surface (11.2) on the slats (43.3) tip back over the edge of the slat into the intermediate store (43.1) because of the different center of gravity as compared with the correctly oriented closure caps. In an upper region of the transporting belt (43.2), which adjoins the sorting section (43.4), the closure caps (11) are blown out laterally by an air stream and a conveyed stream of a single line of closure caps (11) is formed by means of guides.

This conveyed stream of a single line passes through the inspection system (30) in a transporting direction (31.1) by means of a continuous conveyor (31). The continuous conveyor (31) is designed for example as a circulating two-line transporting belt. The continuous conveyor (31) may also be made up of a number of circulating transporting belts with corresponding transfers between the transporting belts.

Arranged above the continuous conveyor (31) is a digital camera (33) for detecting the at least one geometric feature of each closure cap (11). In the present case, the digital camera (33) is arranged above the continuous conveyor (31) in such a way that it detects the diameter of the end opening (11.1) of the closure caps (11) resting with the bottom surface (11.2) on the two-line transporting belt of the continuous conveyor (31). Arranged upstream of the digital camera (33) in the transporting direction (31.1) is a radiation sensor (32) for the contactless measurement of the temperature of each closure cap (11). As can be seen in particular in FIG. 3, the radiation sensor (32) is arranged with its measuring axis preferably in the horizontal direction and aligned with the lateral surface (11.3) of the closure caps (11) passing through. In order to create constant controlled boundary conditions for the temperature measurement with the radiation sensor (32), the beam of the radiation sensor (32) hits a diaphragm (32.1). The individually separated caps (11) pass through the beam between the radiation sensor (32) and the diaphragm (32.1) in the transporting direction (31.1). The temperature of the diaphragm (32.1) is kept constantly at a specified level by means of a Peltier element, which is not shown.

Figure 3:
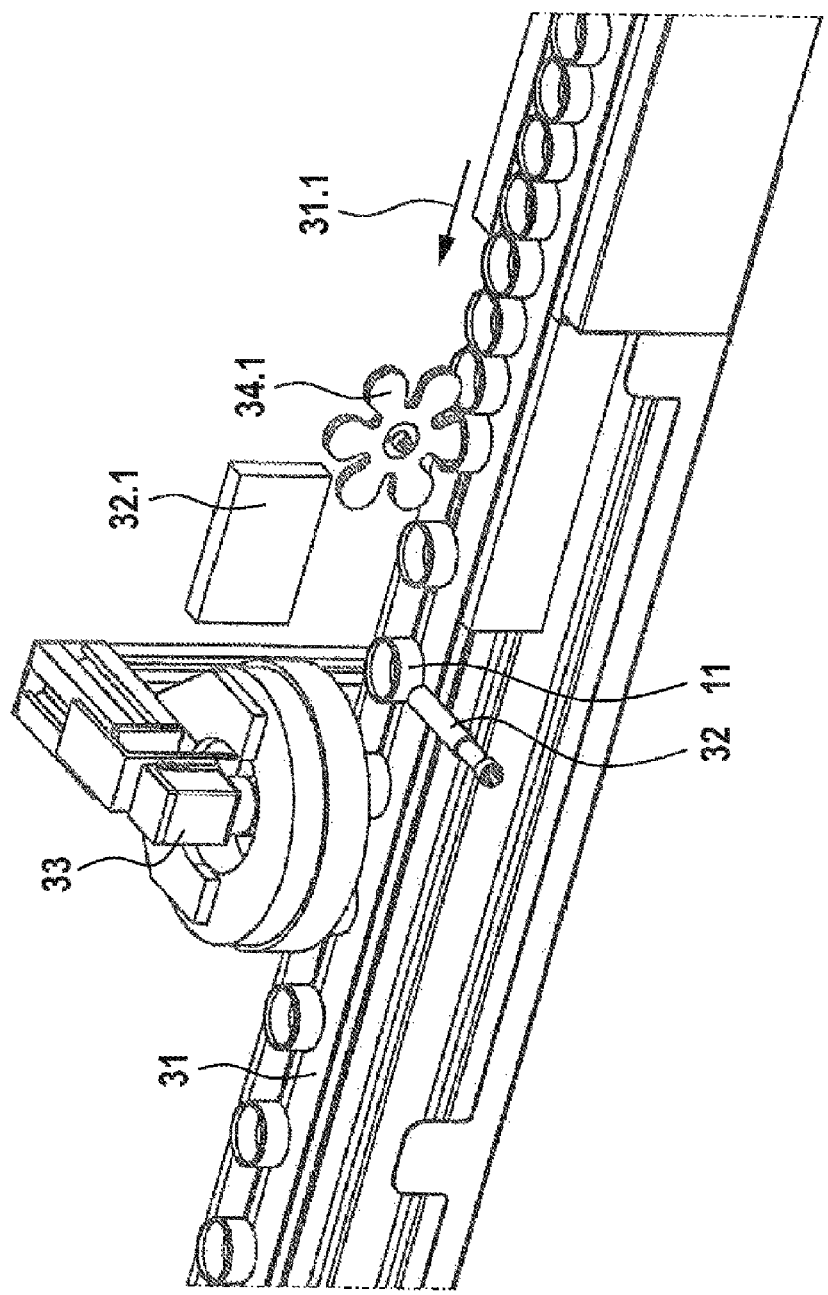

Arranged upstream of the radiation sensor (32) in the transporting direction (31.1) is a separator (34), which is set up for individually separating the closure caps (11) transported in the conveyed stream of a single line, so that all of the closure caps (11) in the conveyed stream are at a consistent distance from one another, as can be seen in FIG. 3. The separator (34) is formed by a toothed wheel (34.1). The axis of the toothed wheel (34.1) runs horizontally, so that the teeth of the wheel (34.1) engage in the end openings (11.1) of the closure caps (11).

The radiation sensor (32) is an infrared pyrometer for very rapid measurements in a temperature range of −50 to 975 degrees Celsius with a reception wavelength in the infrared range of 8-14 μm.

The detection of the geometric features of the molded parts (10) and the control of the production process are explained below:

The closure caps (11) demolded from the molding tool (24) of the casting or molding machine (20) are transported to the inspection system (30) by means of the conveying device (40) while they are cooling down from the elevated temperature caused by the casting or molding heat. On the transporting route from the casting or molding machine (20) to the inspection system (30) there are various locations at which the closure caps are not further transported in a way corresponding to the sequence of their production in the casting or molding machine (20). In particular in the sorter (43), the time sequence is disrupted due to the rejection of wrongly oriented closure caps (11) and the random position of the piece goods in the intermediate store (43.1).

The closure caps (11) therefore reach the optical inspection system (20) at different stages of cooling down to the surrounding temperature. The closure caps (11) change their geometric features, such as for example the shape or diameter, to a particularly great extent after the demolding from the molding tool (24). The change in the geometric features also depends on the composition of the starting material (21), in particular the added pigment (21.2). The values of the diameter measured by the digital camera (33) in the inspection system (30) therefore do not allow a prediction of what diameter the closure (11) will have after cooling down completely to surrounding temperature to be made with certainty. In order to correct this uncertainty of the geometric features detected by the digital camera (33), the detected diameter values are corrected with the aid of a calibrating function while taking into account the temperatures detected by the radiation sensor (33). The calibrating function is determined in advance on the basis of reference closure caps with a diameter in the set range and describes the change in the geometric feature, here the diameter, in dependence on the temperature of the reference closure cap. For this purpose, the temperature behavior of a reference closure cap over the temperature range to be expected during the cooling down from the time of demolding to the surrounding temperature is investigated. The calibrating function obtained in this way is stored for example in the computer system (50) of the inspection system (30). Taking into account the temperature detected by the radiation sensor (32) for each diameter value of a closure cap (11), a corrected, temperature-normalized diameter value, for example the diameter value after cooling down completely to the surrounding temperature, can be ascertained with the aid of the calibrating function.

The correcting of the diameter value may be performed individually for each closure cap (11). Alternatively, the detected diameter values and the measured temperatures may be corrected in groups. For the processing of the values in groups, for example a prior classification of the measured temperatures and the associated diameter values comes into consideration.

The corrected diameter values are compared as a controlled variable with a setpoint value for the diameter as a reference variable. A deviation between the controlled variable and the reference variable outside a tolerance range is fed to a controller, which uses an actuator to form a manipulated variable for a controlled system of the injection-molding machine. In the case of an injection-molding machine, the temperature of the heating means (22.5) of the plasticizing unit (22), the speed of the screw (22.3), the temperature of the cooling means (24.5) of the molding tool (24) and the setting of the opening time of the clamping unit (23) come into consideration for example as the manipulated variable. With these manipulated variables, disturbances in the starting material, changes in the temperature of the coolant and gradual changes in the plasticizing unit due to deposits or wear can be corrected.

| List of reference signs | |
|---|---|
| No. | Designation |
| 10. | Molded parts |
| 11. | Closure caps |
| 11.1 | End opening |
| 11.2 | Bottom surface |
| 11.3 | Lateral surface |
| 12. | Arrow |
| 20. | Casting or molding machine |
| 21. | Starting material |
| 21.1 | Polymer pellets |
| 21.1 | Pigment |
| 22. | Plasticizing unit |
| 22.1 | Plasticizing cylinder |
| 22.2 | Motor |
| 22.3 | Screw |
| 22.4 | Nozzle |
| 22.5 | Heating means |
| 23. | Clamping unit |

-continued

| List of reference signs | |
|---|---|
| No. | Designation |
| 24. | Molding tool |
| 24.1 | Nozzle side |
| 24.2 | Ejector side |
| 24.3 | Mold parting plane |
| 24.4 | Drive |
| 24.5 | Cooling means |
| 24.6 | Cavities |
| 30. | Inspection system |
| 31. | Continuous conveyor |
| 31.1 | Transporting direction |
| 32. | Radiation sensor |
| 32.1 | Diaphragm |
| 33. | Camera |
| 34. | Separator |
| 34.1 | Toothed wheel |
| 40. | Conveying device |
| 41. | Delivery belt |
| 42. | Ascending cooling conveyor |
| 42.1 | Transporting belt |
| 42.2 | Horizontal portion |
| 42.3 | Inclined portion |
| 42.4 | Driver |
| 43. | Sorter |
| 43.1 | Intermediate store |
| 43.2 | Transporting belt |
| 43.3 | Slats |
| 43.4 | Sorting section |
| 50. | Computer system |

The invention claimed is:

1. A method for detecting a geometric feature of consistent molded parts in an inspection system comprising the following steps:
producing the molded parts in a molding tool of a casting or molding machine,
demolding the molded parts from the molding tool at an elevated temperature in comparison with a surrounding temperature,
cooling down the molded parts from the elevated temperature to the surrounding temperature,
transporting the molded parts along a single transport conveying path to the inspection system after the step of demolding and while the molded parts are cooling down, wherein the molded parts are at least partially mixed during the transporting along the single transport conveying path and durations of the transporting for at least some of the molded parts to the inspection system have different lengths,
detecting the geometric feature and contactlessly measuring a temperature of each of the molded parts while the molded parts are passing through the inspection system in a conveyed stream, and
determining a corrected detected geometric feature of the each of the molded parts using a calibrating function taking into account the detected geometric feature and the measured temperature of the each of the molded parts to obtain the corrected detected geometric feature, wherein the calibrating function describes a change in the geometric feature in dependence on the measured temperature of a reference molded part, of which the geometric feature lies in a set range for the molded parts to be produced.

2. The method as claimed in claim 1, the detecting of the geometric feature is performed using at least one digital camera.

3. The method as claimed in claim 1, wherein contactlessly measuring of the temperature is performed by at least one radiation sensor.

4. The method as claimed in claim 3, wherein a beam emitted by the at least one radiation sensor hits a diaphragm and a conveyed stream of the molded parts passes through the beam between the at least one radiation sensor and the diaphragm.

5. The method as claimed in claim 4, wherein the temperature of the diaphragm is kept constant.

6. The method as claimed in claim 1, wherein a time period between the detecting of the geometric feature and the contactlessly measuring of the temperature of the each molded part is a maximum of 1 second.

7. The method as claimed in claim 1, wherein the molded parts pass through the inspection system in a conveyed stream in a single row.

8. The method as claimed in claim 7, wherein the molded parts in the conveyed stream of the single row are individually separated, so that the molded parts are separated from each other by a consistent distance.

9. The method as claimed in claim 7, wherein the speed of the conveyed stream of the molded parts is periodically reduced for a time.

10. The method as claimed in claim 1, wherein the molded parts are transported through the inspection system at a speed of between 100 m/min and 240 m/min.

11. The method as claimed in claim 1, wherein the detecting of the geometric features and the contactlessly measuring of the temperature are performed at an object rate in the range of 40 to 80 molded parts/second.

12. The method as claimed in claim 1, wherein the corrected detected geometric feature of the each of the molded parts is compared as a controlled variable with a setpoint value for the geometric feature as a reference variable, a deviation between the controlled variable and the reference variable outside a tolerance range is fed to a controller, which forms a control variable for a controlled system of the casting or molding machine.

13. A device for detecting at least one geometric feature of consistent molded parts comprising:
a casting or molding machine with a molding tool configured for producing the molded parts,
an inspection system having at least one digital camera, at least one radiation sensor, and a continuous conveyor, the at least one digital camera detecting the geometric feature of each of the molded parts, the at least one radiation sensor contactlessly measuring the temperature of the each of the molded parts, the continuous conveyor conveying the molded parts in a conveyed stream, and the continuous conveyor being arranged in relation to the at least one digital camera and the at least one radiation sensor in such a way that each molded part in the conveyed stream enters a beam of the at least one digital camera and a beam of the at least one radiation sensor,
a conveying device transporting the molded parts demolded from the molding tool along a single transport conveying path to the inspection system, the molded parts cooling down on the conveying device, wherein the conveying device is configured so that the molded parts are at least partially mixed during the transporting along the single transport conveying path and durations of the transporting for at least some of the molded parts to the inspection system have different lengths, and a computer system processing and determining a corrected detected geometric feature of the each molded part using a calibrating function taking into account the detected geometric feature and the measured temperature of the each molded part to obtain the corrected detected geometric feature, the calibrating function used in the computer system describes the change in the geometric feature in dependence on the measured temperature of a reference molded part, of which the geometric feature lies in a set range for the molded parts to be produced.

14. The device as claimed in claim 13, wherein the continuous conveyor transports the molded parts in the conveyed stream in a single row.

15. The device as claimed in claim 14, wherein the inspection system further comprises a separator arranged upstream of the at least one radiation sensor and the at least one digital camera in a transporting direction, the separator individually separating the molded parts so that the molded parts in the conveyed stream are separated from each other by a consistent distance.

16. The device as claimed in claim 13, wherein the continuous conveyor is configured to periodically reduce the speed of the conveyed parts.

17. The device as claimed in claim 13, further comprising a temperature-controlled diaphragm arranged in a path of a beam emitted by the at least one radiation sensor, wherein the continuous conveyor is arranged in relation to the at least one radiation sensor and the diaphragm in such a way that the conveyed stream of the molded parts passes through the beam between the at least one radiation sensor and the diaphragm and the temperature of the diaphragm is kept constant.

* * * * *